United States Patent
Arnold

(10) Patent No.: US 11,421,803 B2
(45) Date of Patent: Aug. 23, 2022

(54) CABLE FASTENER

(71) Applicant: Stanley Eugene Arnold, Santa Clarita, CA (US)

(72) Inventor: Stanley Eugene Arnold, Santa Clarita, CA (US)

(*) Notice: Subject to any disclaimer, the term of this patent is extended or adjusted under 35 U.S.C. 154(b) by 0 days.

(21) Appl. No.: 17/363,923

(22) Filed: Jun. 30, 2021

(65) Prior Publication Data

US 2021/0324972 A1    Oct. 21, 2021

Related U.S. Application Data

(60) Provisional application No. 63/048,823, filed on Jul. 7, 2020.

(51) Int. Cl.
    *F16L 3/22*    (2006.01)
    *F16L 3/24*    (2006.01)
    *F16L 3/13*    (2006.01)
    *H02G 3/32*    (2006.01)

(52) U.S. Cl.
    CPC ............. *F16L 3/222* (2013.01); *F16L 3/13* (2013.01); *F16L 3/243* (2019.08); *H02G 3/32* (2013.01)

(58) Field of Classification Search
    CPC ... F16L 3/222; F16L 3/243; F16L 3/13; F16L 3/32; F16L 3/223; F16L 3/2235; F16L 3/227; F16L 3/22; F16L 3/24; F16L 3/127; H02G 3/32
    USPC ............................................. 248/68.1
    See application file for complete search history.

(56) References Cited

U.S. PATENT DOCUMENTS

| | | | | |
|---|---|---|---|---|
| 2,354,919 A | * | 8/1944 | Lockwood | F16L 3/2235 248/68.1 |
| 2,404,531 A | * | 7/1946 | Robertson | F16L 3/2235 248/68.1 |
| 4,880,280 A | | 11/1989 | Panzica | |
| 5,090,645 A | * | 2/1992 | Zuercher | F16L 3/223 24/336 |
| 5,785,285 A | * | 7/1998 | Gordon | F16L 3/13 74/498 |
| 7,131,170 B2 | * | 11/2006 | Weaver | A46B 17/02 248/316.7 |
| 8,596,589 B2 | * | 12/2013 | Hennon | F16L 3/222 248/65 |

(Continued)

OTHER PUBLICATIONS

AFC Cable Systems, "MC Snapit" line of products, https://www.afcweb.com/accessories/mc-snapit/ (accessed and archived Jun. 9, 2021). Click on photo and click through to 2nd photo. See cylindrical clips mounted on different 3D support structures.

(Continued)

*Primary Examiner* — Christopher Garft
(74) *Attorney, Agent, or Firm* — Scot Fagerland

(57) ABSTRACT

An improved fastener for securing cables to metal studs has two main components: a cable clip assembly and a dual spacer. The cable clip assembly supports a plurality of cable clips with three mutually perpendicular planar structures for sturdiness. The cable clip assembly can be mounted directly to the flat side of a metal stud. Mount holes are provided non-coplanar with the cables, to provide easy access for screw mounting. The dual spacer attaches to the cable clip assembly. The dual spacer adapts the fastener for secure mounting to the open side of a metal stud.

4 Claims, 7 Drawing Sheets

(56) References Cited

U.S. PATENT DOCUMENTS

| | | | | |
|---|---|---|---|---|
| 9,822,907 | B1* | 11/2017 | Hennon | F16L 3/133 |
| 10,443,644 | B2* | 10/2019 | Hennon | F16L 3/1091 |
| 2007/0235596 | A1* | 10/2007 | Youmans | F16L 3/223 |
| | | | | 248/68.1 |
| 2018/0038518 | A1* | 2/2018 | Hennon | F16M 13/02 |

OTHER PUBLICATIONS

Arlington, "NM310 3/8" Non-Met MC Strap", https://www.zoro.com/arlington-arl-nm310-38-non-met-mc-strap-nm310/i/G4836459/ (accessed and archived Jun. 9, 2021). See dual spacer structure.

Arlington, "SMC8", http://www.aifittings.com/catalog/flex-ac-mc-fittings/steel-cable-hangers/smc8 (accessed and archived Jun. 10, 2021). Click on any image to see screw mount holes.

Carlisle Tire, "16×6 Carlisle White Spoke Trailer Wheel (6 Lug)", PetesTireStore.com/16×6-Carlisle-White-Spoke-Trailer-Wheel-6-Lug_p_11305.html (accessed and archived Jun. 9, 2021). See 6-lug configuration.

Eaton, "BRCJ cable support", https://www.eaton.com/us/en-us/catalog/support-systems/cable-support-fasteners.models.html (accessed and archived Jun. 9, 2021). See 1-1/4" centering tab. This entire webpage is dedicated to "Cable to beam fasteners".

Gardner Bender Store, "Gardner Bender #MCS-20W 20PK Wood Stud Staple", https://www.amazon.com/Gardner-Bender-MCS-20W-20PK-Staple/dp/B001E7SL9A (accessed and archived Jun. 10, 2021). Click on 2nd image for best view of base with mount holes and centering tab.

Grainger, "Round, Spacer, Nylon, Black, 1/2 in Outside Dia., PK 10", https://www.grainger.com/product/3ZML1 (accessed and archived Jun. 10, 2021).

Profile Designs, "Aerobar Bracket Riser Kit Black", https://www.amazon.com/Profile-Design-Aerobar-Bracket-Riser/dp/B00X0GPVRS (accessed and archived Jun. 10, 2021). Somewhat analagous to dual spacer structure.

Time Saver Products, "AK6-4 Snap On MC Cable Stud Support for 6" Stud", https://www.ebay.com/itm/264805782493 (accessed and archived Jun. 10, 2021). See plurality of consecutive cylindrical clips.

* cited by examiner

CABLE FASTENER

1. FIELD OF THE INVENTION

This invention is in the field of clips to support cables, specifically to fasten cables to studs.

2. BACKGROUND OF THE INVENTION

MC (Metal Clad) cables are used for supporting high voltage (120-277 volt) wires in commercial construction wiring, and CAT 5 cables are used for low voltage (telephone, computer, alarm) wiring. During construction of commercial property, cables must be mounted to studs within the walls. Many interior walls use aluminum studs, which only have three faces. Thus, an aluminum stud has a "flat" side and an "open" side.

Cable clips are subject to national codes. In the United States, for example, electrical products are regulated by the National Electric Code (NEC) and certified by Underwriter Laboratories (UL). NEC 300.4 (D) requires 1¼" clearance from both faces of the stud to protect from penetration of the cables from either a drywall nail or screw. The NEC also mandates separation of high-voltage and low-voltage cables.

3. DESCRIPTION OF RELATED TECHNOLOGY

Cable-to-metal-stud fasteners take two standard forms. Some fasteners clip to the stud. Others are screw-mounted to the flat side of the stud.

4. SUMMARY OF THE INVENTION

This product is a clip assembly for screw-mounting cables to metal studs. It improves upon the functionality of mounting an assortment of cable types. It also cuts down on installation time. The primary component is a cable clip assembly. The secondary component is a dual spacer for securing the cable clip assembly to the open side of a metal stud.

5. BRIEF DESCRIPTION OF THE DRAWINGS

Figure 3:
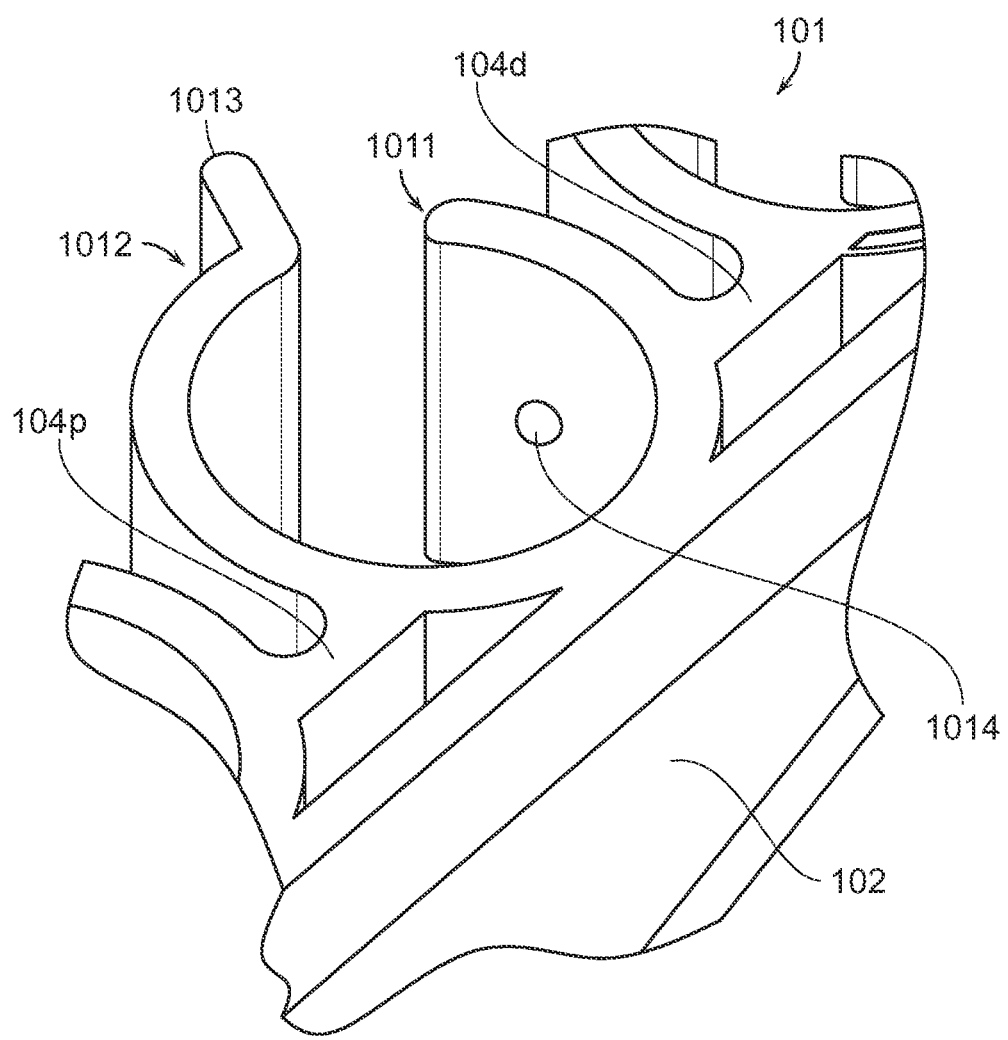

FIG. 3 zooms in on one clip on the cable clip assembly.

Figure 4:
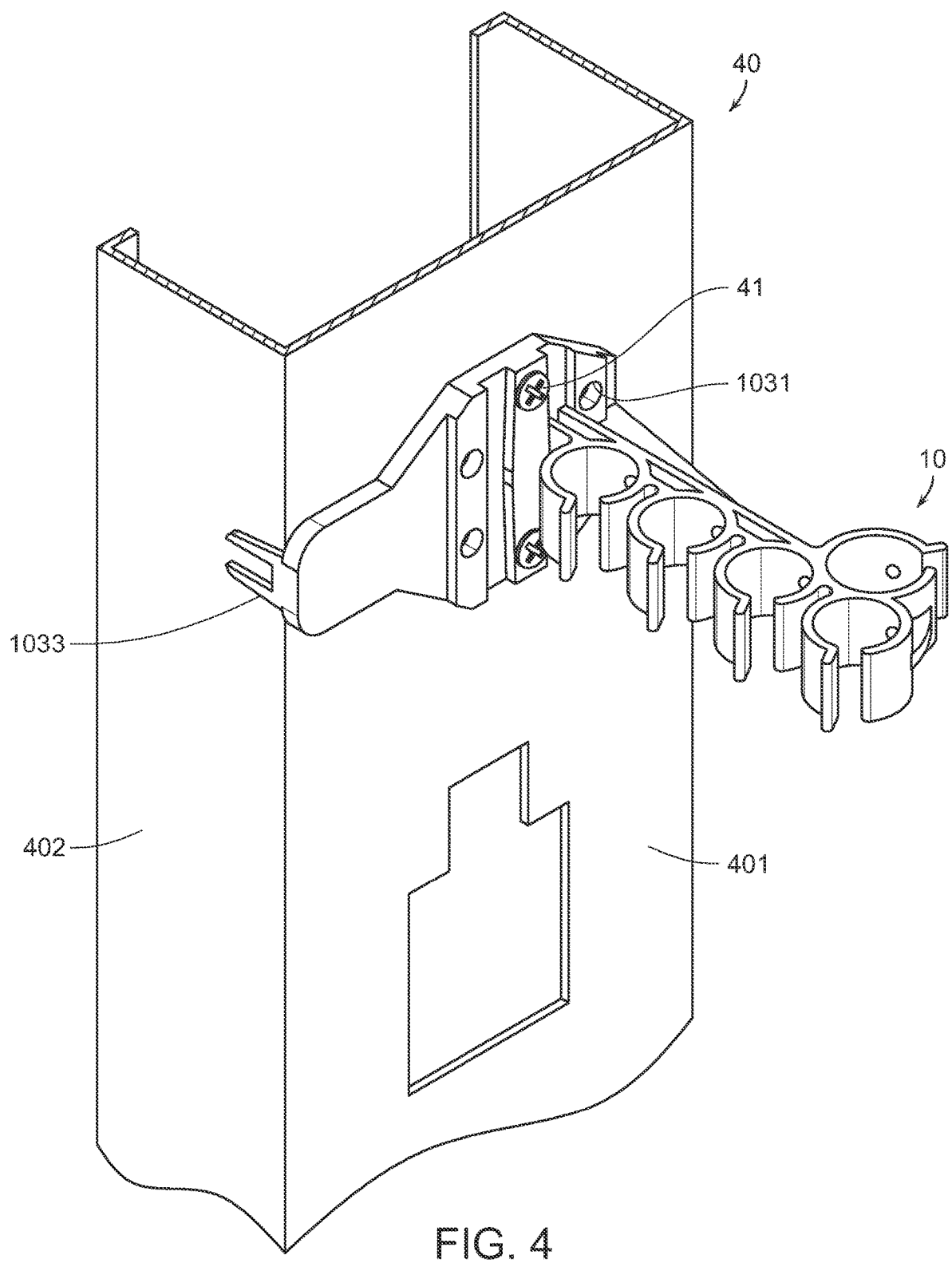

FIG. 4 shows the cable clip assembly mounted to the flat side of a stud.

Figure 5:
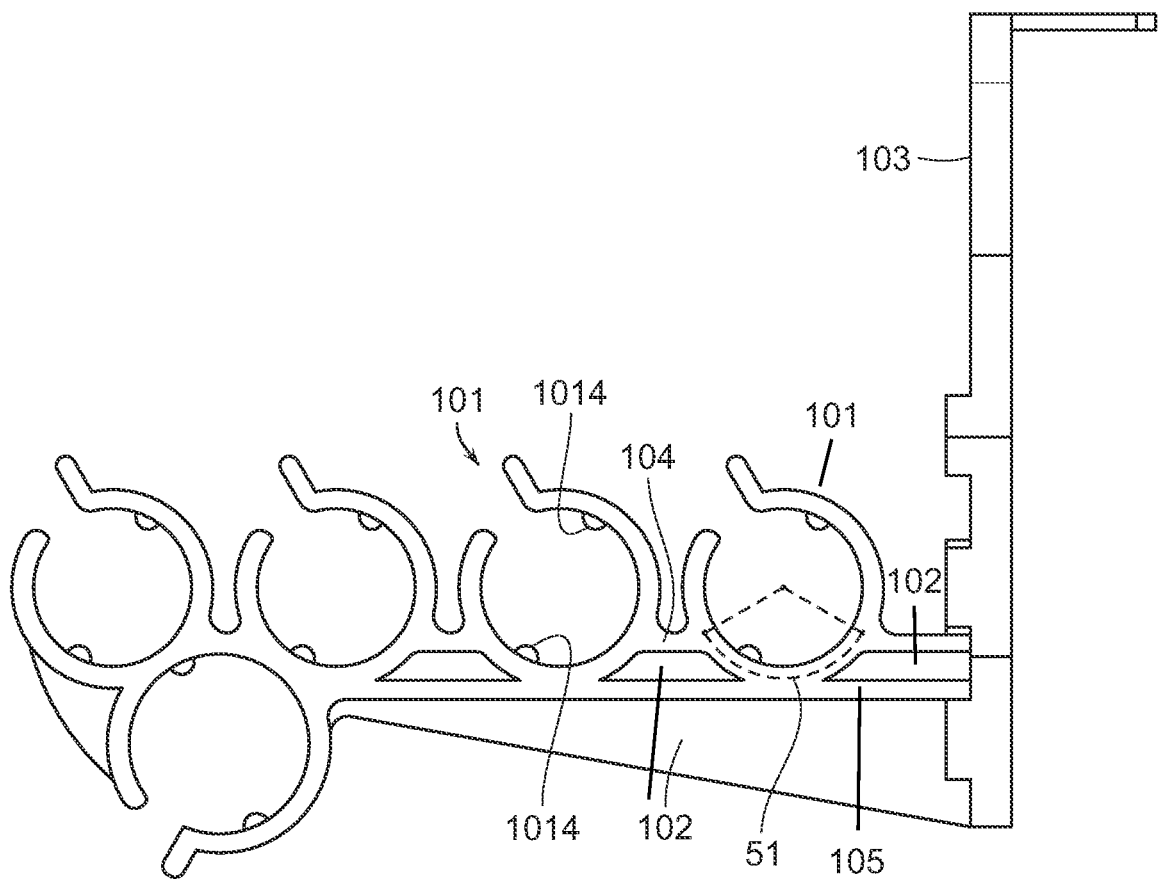

FIG. 5 is a bottom view of the cable clip assembly.

Figure 6:
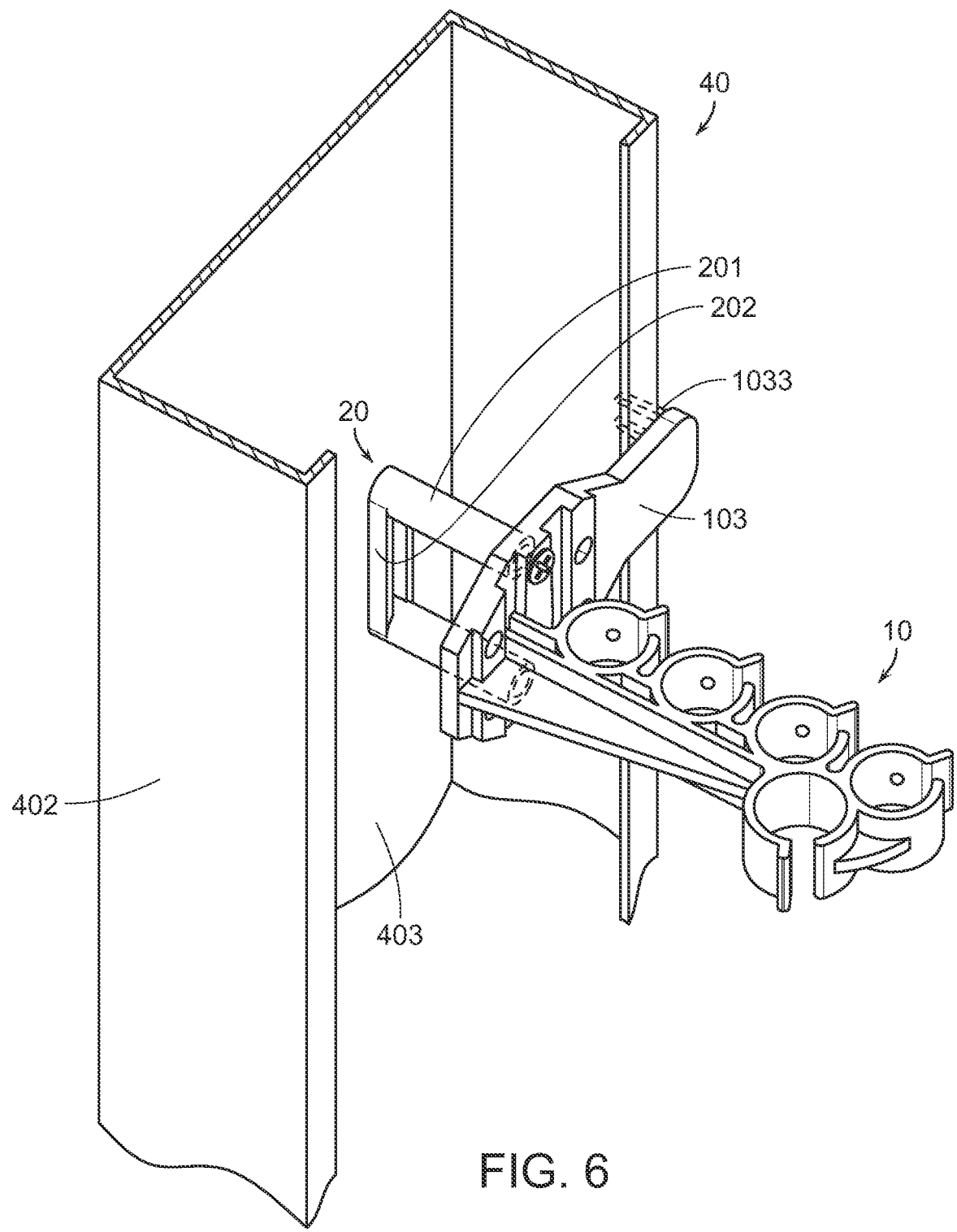

FIG. 6 shows the dual spacer used in combination with the cable clip assembly, for mounting to the open side of a metal stud.

Figure 7:
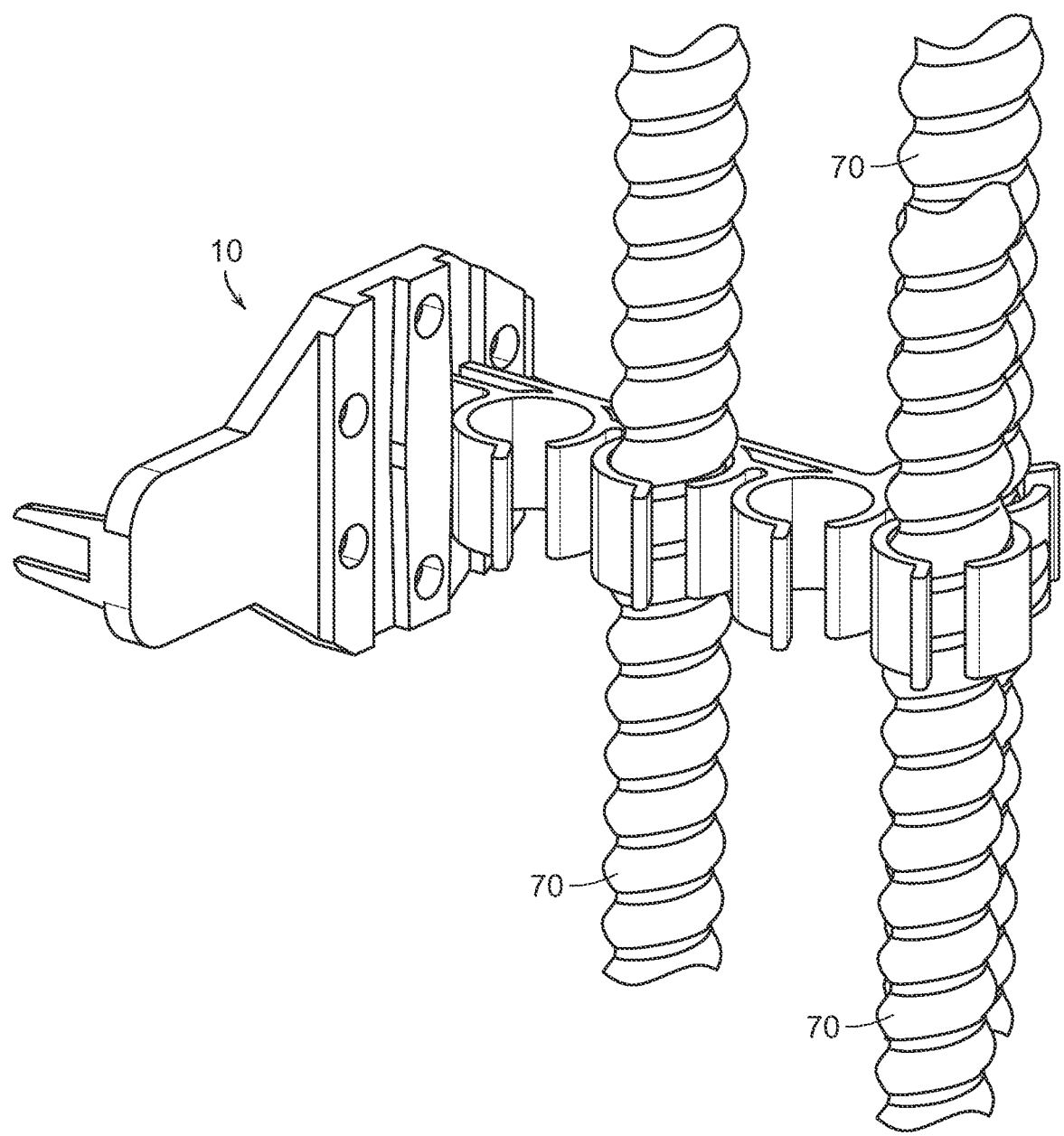

FIG. 7 shows the cable clip assembly supporting a plurality of cables.

Figure 8:
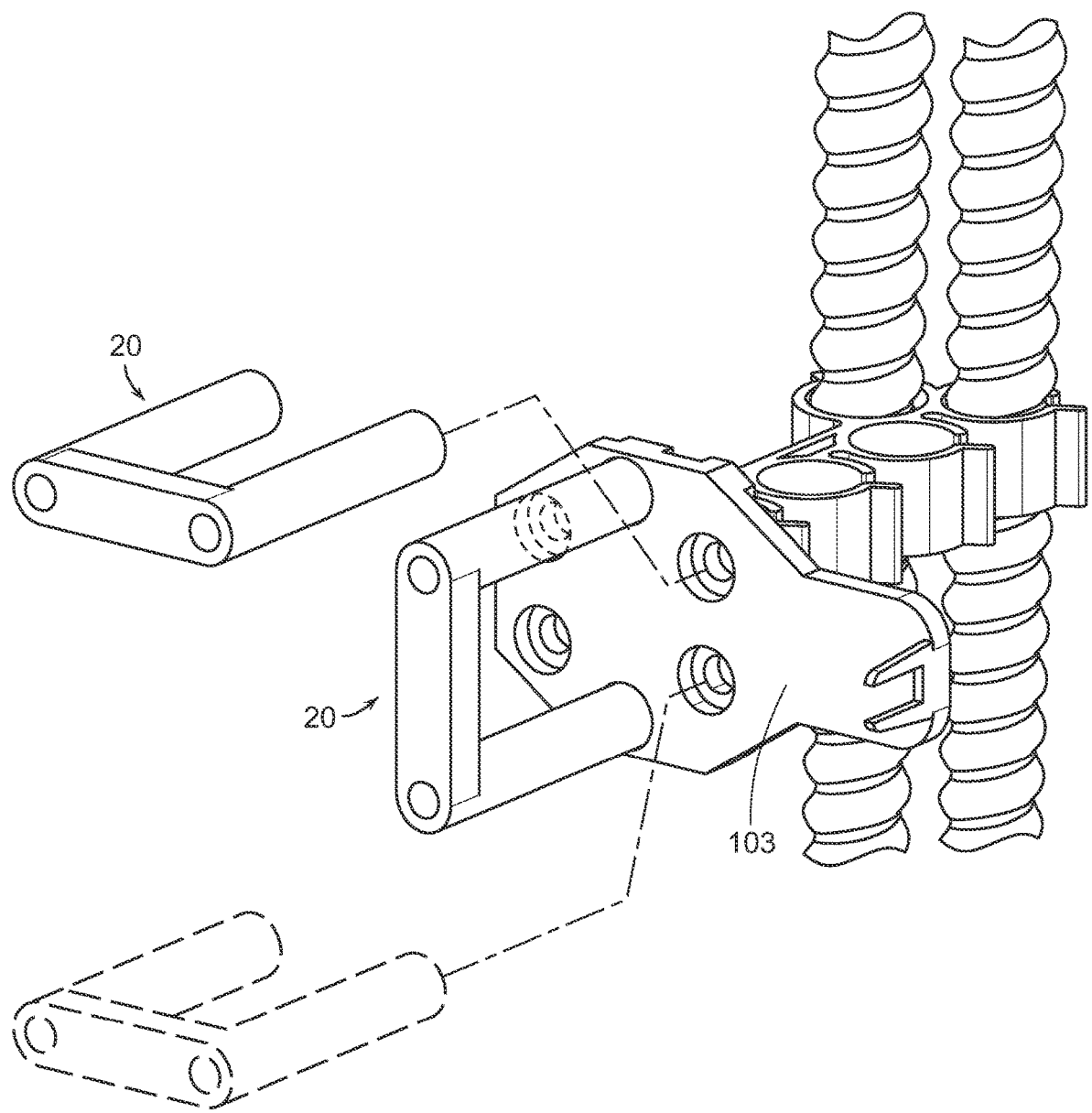

FIG. 8 shows the dual spacer engaging with the base of the cable clip assembly.

6. DETAILED DESCRIPTION OF THE PREFERRED EMBODIMENTS

Figure 1:
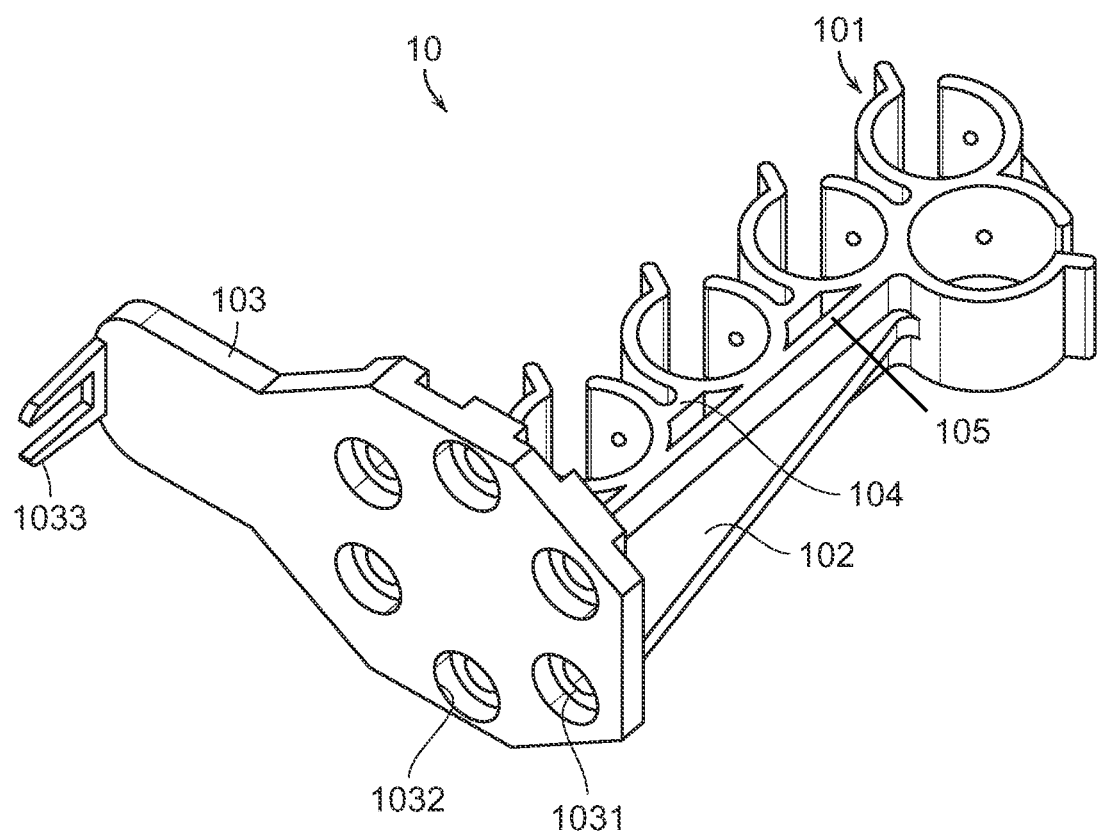
FIG. 1 shows the "cable clip assembly" component of the invention and the coordinate system in which it is described.

Referring to FIG. 1, the primary component of the invention is the cable clip assembly 10. The assembly comprises a plurality of cable clips 101. The clips are supported by substrates in three perpendicular planes: the stiffening rib 102, the base 103, and a plurality of longitudinal ribs 104. The base is perforated by a plurality of mount holes 1031. Surrounding each mount hole is a counterbore 1032. A centering tab 1033 protrudes from one end of the base, perpendicular to the base.

The three-dimensional characteristics of the cable clip assembly are important. For purposes of this description, the cable clip assembly shall be described in terms of three imaginary axes. The plane of the base defines the proximal end of the invention; the clips are distal to the base. The "x-direction" will be defined by a line that has length in the proximal-distal direction. When the fastener is mounted on a stud, as best seen in FIG. 4, the x-direction will be horizontal and perpendicular to the face of the stud to which the fastener is screw-mounted. The "y-direction" will be defined by the axes of the cylindrical clips, i.e. perpendicular to the stiffening rib 102. When the fastener is mounted to a stud, the y-direction will be vertical, and the cables will extend locally in the y-direction. Words such as up/down, above/below, or "height" are appropriate y-direction terms. The z-direction will be the axis mutually perpendicular to the x- and y-directions. The direction in which four clips are shown to open in FIG. 1 shall arbitrarily be designated as the "front", and the direction in which the single clip is shown to open in FIG. 1 shall accordingly be called the "back" direction. When the fastener is mounted to a stud, the z-axis will be horizontal and parallel to the face of the stud to which the clip is mounted.

Figure 2:
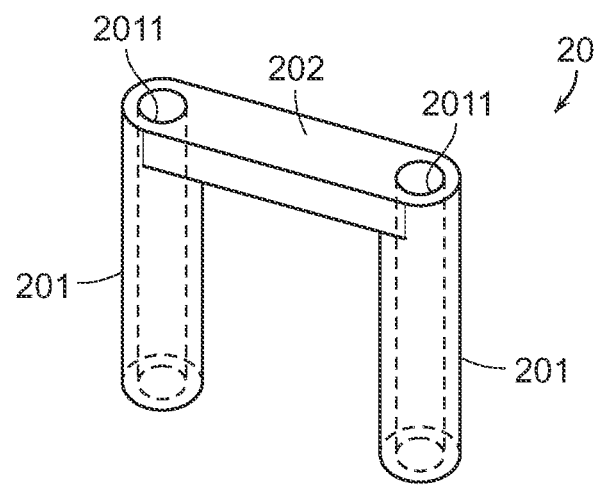
FIG. 2 shows the "dual spacer" component of the invention.

The secondary component of the invention, the dual spacer, is shown in FIG. 2. The dual spacer comprises two spacers 201. Each spacer is a hollow straw-shaped cylinder, with spacer hole 2011 extending through the entire length of the spacer. The two spacers are connected by a crossbar 202. The coordinate system of the cable clip assembly shall be applied to the dual fastener in a manner that will be consistent when the two components are joined as in FIG. 6 or 8. That is, the crossbar 202 is at the "proximal" end of the dual spacer.

The multiple cable clips 101 can be used for either high-voltage or low-voltage applications. The clips separate the cables to support low and high voltage cables in one unit. Multiple cable sizes can be used as well in each of the 5 support clips. The optimal smaller clip diameter is approximately 0.475" to accommodate 12/2, 12/3, or 10/2 MC cable. The optimal larger clip diameter is approximately 0.586" for accommodating 10/3 MC cable.

FIG. 3 shows the detailed features of one cable clip 101. It is substantially a standard C-shaped cylindrical clip with axis in the y-direction. Each clip has a rigid end 1011 in proximity to a distal longitudinal rib 104*d*. The rigid end is stiff enough to remain stationary in a 50 lb. pull test. Each clip also has an elastic end 1012 in proximity to a proximal chordal rib 104*p*. The elastic end 1012 opens when forced, allowing the cable to be forced into the mounting position. The obvious modification to this structure resulting from a mirroring of the clips in the proximal/distal direction is anticipated by this disclosure.

A clip tab 1013 extends from the elastic end 1012. The clip tab can be used to assist in pushing or clipping the cable into place or to remove the cable to change the installation. Each cable is installed independently from the other cables, preventing the need to release all cables in order to make a change or adjustment to one or more. On the inside of each cable clip are two small point protrusions 1014, best seen in FIG. 5. When a cable is inserted into a clip, each point protrusion fits into cable threads 701 (see FIG. 7), thus restricting movement of the cables.

On the spine of the cable clips, a stiffening rib 102 prevents extreme deflection as the cables are installed. This provides a consistent application of the cables regardless of how many cables are installed or which cable clips support them. The stiffening rib is best displayed in FIGS. 1 and 5. Note three key features of the stiffening rib that optimize it and/or distinguish it from the prior art. (1) It lies in the x-z plane, perpendicular to the y-axes of the clips. (2) As shown in FIG. 5, it contacts each clip in an arc 51 of 45-180°, ideally approximately 90°. (3) As shown in FIG. 1, it is attached to the center of each clip in the y-direction, not at the top or bottom.

The stiffening rib 102 is attached to the base 103, as best seen in FIG. 5 or 6. Note that the base lies in the y-z plane, perpendicular to the stiffening rib.

The front cable clips are further supported by longitudinal ribs in the x-y plane, perpendicular to both the stiffening rib 102 and the base 103. The longitudinal ribs include chordal ribs 104 and tangential ribs 105. These ribs provide additional strength and stability in a vertical direction. As a consequence, the cable clip assembly is built around three mutually perpendicular planar supports. This core configuration gives the assembly exceptional stability.

Each front-facing clip 101 has a proximal chordal rib 104*p* and/or a distal chordal rib 104*d*, best seen in FIG. 3. The chordal ribs 104 attach to the circle of each clip 101 at two points that could be joined by a chord of the circle. This chord could be the diameter, though it is found that offsetting the ribs chordally allows for wider opening of the clip. The tangential ribs 105 intersect each cylindrical clip tangentially.

The obvious modifications of changing the number of front- or back-facing clips and adding longitudinal ribs between consecutive back-facing clips are anticipated by this disclosure.

FIG. 4 illustrates a cable clip assembly 10 mounted to the flat side 401 of a metal stud 40. The base 103 of the cable clip assembly 10 is perforated with at least one pair of mount holes 1031. Screws 41 are inserted into the mount holes from the distal direction, i.e. with the head of the screw distal to the base and the bolt end of the screw proximal to the base. The mounting procedure works best when there are three pairs of mount holes arranged at the vertices of a regular hexagon, as shown in FIG. 1. Any of the three pairs can be used when the installer is in the field while there are no cables installed in the cable clips. Sometimes, however, it is advantageous to "prefabricate" or insert cables into the clips off-site before the clips are sent to the construction site. Prefabricated cables block access to the primary pair of screws in the x-y plane; see FIGS. 7 and 8. At least one pair of mount holes that does not lie in the x-y plane is therefore provided for easy access. FIG. 4 shows the best view of the centering tab 1033. The centering tab is positioned at one end of the base at least 1.25" from the center of the mount holes. When the centering tab 1033 is flush with a side edge 402 of the stud 40, it ensures that the cables 70 (see FIG. 7) are at least 1.25" from the edge of the stud, in compliance with NEC code 300.4 (D).

As seen in FIG. 6, the invention is also adapted to be mounted on the open side 403 of a metal stud 40. The dual spacer 20 is used for this purpose. Referring to FIGS. 1 and 2, counterbores 1032 surround each mount hole 1031 on the proximal surface of the base 103. The counterbores 1032 each have a counterbore diameter, which matches the outer diameter of each spacer 201. The mount diameter between two opposing mount holes 1031 matches the length of the crossbar 202. The diameter of each spacer hole 2011 matches the diameter of each mount hole 1031. With these standardizations, the dual spacer engages with the base 103 as best shown in FIGS. 6 and 8. Each spacer 201 fits into a counterbore 1032, effectively attaching the dual spacer to the cable clip assembly. The crossbar 202 is then held against the stud 40, with the centering tab 1033 in position to engage with a side edge 402 of the stud. Screws 41 extend from the mount holes, through the spacer, to screw into the stud and hold the fastener firmly in place.

I claim:

1. A cable fastener comprising
    a cable clip assembly comprising
        a base with a proximal surface;
        at least one pair of mount holes perforating the base, each mount hole having a mount hole diameter, with the mount holes in each pair separated by a mount pair diameter;
        and a plurality of counterbores, each counterbore concentric with a mount hole on the proximal surface of the base, each counterbore having a counterbore diameter greater than the mount hole diameter;
    and a dual spacer comprising
        two spacers and a crossbar connecting the two spacers;
        each spacer having an outer diameter equal to the counterbore diameter and an inner diameter equal to the mount hole diameter;
        said crossbar having a crossbar length equal to the mount pair diameter;
    wherein the cable clip assembly further comprises
        a plurality of cylindrical clips arranged from a proximal direction to a distal direction along an x axis, with clip axes in a y-direction;
        a stiffening rib in an x-z plane perpendicular to the clip axes, intersecting each cylindrical clip in an arc measuring between 45° and 180°;
        a plurality of chordal longitudinal ribs, one between each pair of consecutive cylindrical clips, lying in an x-y plane, intersecting the stiffening rib at a right angle, and intersecting the cylindrical clips non-tangentially;
        and a tangential longitudinal rib parallel to the chordal longitudinal ribs, lying in an x-y plane, intersecting the stiffening rib at a right angle, and intersecting the cylindrical clips tangentially;
    and the base lies in the y-z plane, intersecting the stiffening rib at a right angle.

2. The cable fastener of claim 1, wherein each cylindrical clip has a rigid end in proximity to a chordal longitudinal rib of the plurality of chordal longitudinal ribs.

3. The cable fastener of claim 2, further comprising at least one point protrusion in each cylindrical clip.

4. The cable fastener of claim 3, wherein the mount holes are arranged in 6-lug configuration.

* * * * *